(12) United States Patent
Huang et al.

(10) Patent No.: US 12,586,251 B2
(45) Date of Patent: Mar. 24, 2026

(54) PATCH ZIPPERING FOR MESH COMPRESSION

(71) Applicant: Tencent America LLC, Palo Alto, CA (US)

(72) Inventors: Chao Huang, Palo Alto, CA (US);
Xiang Zhang, Sunnyvale, CA (US);
Jun Tian, Belle Mead, NJ (US);
Xiaozhong Xu, State College, PA (US);
Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 586 days.

(21) Appl. No.: 17/893,892

(22) Filed: Aug. 23, 2022

(65) Prior Publication Data

US 2023/0063575 A1 Mar. 2, 2023

Related U.S. Application Data

(60) Provisional application No. 63/237,097, filed on Aug. 25, 2021.

(51) Int. Cl.
*G06T 9/00* (2006.01)
*G06T 9/20* (2006.01)

(52) U.S. Cl.
CPC ................ *G06T 9/001* (2013.01); *G06T 9/20* (2013.01)

(58) Field of Classification Search
CPC ............ G06T 9/001; G06T 9/20; G06T 15/00
(Continued)

(56) References Cited

U.S. PATENT DOCUMENTS

| | | |
|---|---|---|
| 6,438,266 B1 | 8/2002 | Bajaj et al. |
| 2013/0024545 A1* | 1/2013 | Sheppard ....... H04N 21/234318 |
| | | 709/217 |

(Continued)

FOREIGN PATENT DOCUMENTS

| | | |
|---|---|---|
| KR | 10-2024-0024069 A | 2/2024 |
| WO | WO-2018039936 A1 * | 3/2018 |
| WO | 2022/269944 A1 | 12/2022 |

OTHER PUBLICATIONS

Cheng, Shyi-Chyi, Chen-Tsung Kuo, and Da-Chun Wu. "A novel 3D mesh compression using mesh segmentation with multiple principal plane analysis." Pattern Recognition 43.1 (2010): 267-279. (Year: 2010).*

(Continued)

*Primary Examiner* — Chineyere Wills-Burns
*Assistant Examiner* — Emmanuel Silva-Avina
(74) *Attorney, Agent, or Firm* — ARENTFOX SCHIFF LLP

(57) ABSTRACT

In some examples, an apparatus for mesh coding includes processing circuitry. The processing circuitry receives a bitstream carrying encoded information of a mesh that is partitioned into patches. The bitstream includes a first portion and a second portion, the first portion includes patch information, the second portion includes patch boundary information that indicates at least a first edge of a first patch and a second edge of a second patch are a pair of edge mates. The processing circuitry decodes the first portion to obtain the patch information, and decodes the second portion to obtain the patch boundary information. The processing circuitry generates a reconstructed mesh based on the patch information and the patch boundary information, the first edge and the second edge are mapped into a same edge in the (Continued)

reconstructed mesh to connect the first patch with the second patch.

19 Claims, 13 Drawing Sheets

(58) Field of Classification Search
USPC ........................................................ 382/233
See application file for complete search history.

(56) References Cited

U.S. PATENT DOCUMENTS

| | | | | |
|---|---|---|---|---|
| 2018/0253867 A1* | 9/2018 | Laroche | .................. | G06T 17/20 |
| 2021/0090301 A1* | 3/2021 | Mammou | ................. | G06T 7/11 |
| 2023/0050860 A1* | 2/2023 | Ilola | .................... | H04N 19/597 |
| 2024/0265638 A1* | 8/2024 | Hayashi | .............. | H04N 19/597 |
| 2024/0346701 A1* | 10/2024 | Kuma | .................... | G06T 17/20 |

OTHER PUBLICATIONS

Gu X, Gortler SJ, Hoppe H. Geometry images. In Proceedings of the 29th annual conference on Computer graphics and interactive techniques, Jul. 1, 2002 (pp. 355-361).

Shewchuk JR. Delaunay refinement algorithms for triangular mesh generation. Department of Electrical Engineering and Computer Science, University of California at Berkeley. May 21, 2001, pp. 1-58.

International Search Report and Written Opinion issued Nov. 23, 2022 in Application No. PCT/US2022/075395, pp. 1-8.

Supplementary European Search Report issued Dec. 21, 2023 in Application No. 22862251.0, pp. 1-12.

Office Action received for Japanese Patent Application No. 2023-532133, mailed on Jun. 4, 2024, 7 pages (4 pages of English Translation and 3 pages of Original Document).

Office Action received for Korean Patent Application No. 10-2023-7010223, mailed on Jul. 29, 2024, 9 pages (5 pages of English Translation and 4 pages of Original Document).

* cited by examiner

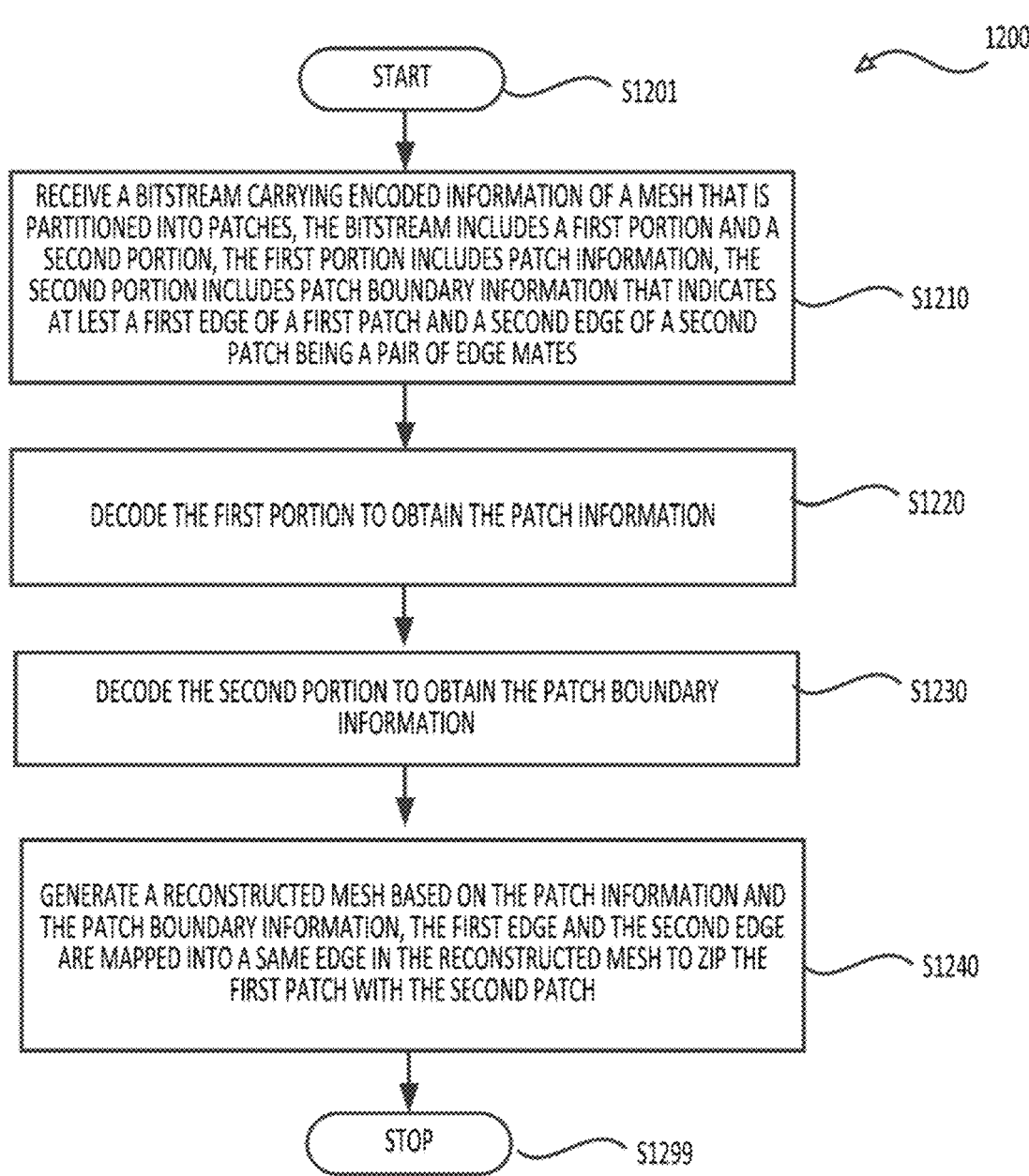

1200

START ~ S1201

RECEIVE A BITSTREAM CARRYING ENCODED INFORMATION OF A MESH THAT IS PARTITIONED INTO PATCHES, THE BITSTREAM INCLUDES A FIRST PORTION AND A SECOND PORTION, THE FIRST PORTION INCLUDES PATCH INFORMATION, THE SECOND PORTION INCLUDES PATCH BOUNDARY INFORMATION THAT INDICATES AT LEST A FIRST EDGE OF A FIRST PATCH AND A SECOND EDGE OF A SECOND PATCH BEING A PAIR OF EDGE MATES ~ S1210

DECODE THE FIRST PORTION TO OBTAIN THE PATCH INFORMATION ~ S1220

DECODE THE SECOND PORTION TO OBTAIN THE PATCH BOUNDARY INFORMATION ~ S1230

GENERATE A RECONSTRUCTED MESH BASED ON THE PATCH INFORMATION AND THE PATCH BOUNDARY INFORMATION, THE FIRST EDGE AND THE SECOND EDGE ARE MAPPED INTO A SAME EDGE IN THE RECONSTRUCTED MESH TO ZIP THE FIRST PATCH WITH THE SECOND PATCH ~ S1240

STOP ~ S1299

*FIG. 12*

PATCH ZIPPERING FOR MESH COMPRESSION

INCORPORATION BY REFERENCE

This present application claims the benefit of priority to U.S. Provisional Application No. 63/237,097, "Patch Zippering for Mesh Compression" filed on Aug. 25, 2021, which is incorporated by reference herein in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh coding includes processing circuitry. The processing circuitry receives a bitstream carrying encoded information of a mesh that is partitioned into patches. The bitstream includes a first portion and a second portion, the first portion includes patch information, the second portion includes patch boundary information that indicates at least a first edge of a first patch and a second edge of a second patch are a pair of edge mates. The processing circuitry decodes the first portion to obtain the patch information, and decodes the second portion to obtain the patch boundary information. The processing circuitry generates a reconstructed mesh based on the patch information and the patch boundary information, the first edge and the second edge are mapped into a same edge in the reconstructed mesh to connect (zip) the first patch and the second patch together.

In some examples, the patch information decoded from the first portion has different patch boundary information from the patch boundary information decoded from the second portion.

In some examples, the processing circuitry decodes a boundary table from the second portion, the boundary table includes lists of boundary vertices of the patches. The processing circuitry determines a first list of boundary vertices for the first patch and a second list of boundary vertices for the second patch according to the boundary table. Further, the processing circuitry determines first boundary edges for the first patch according to the first list of boundary vertices, and determines second boundary edges of the second patch according to the second list of boundary vertices. The first edge is one of the first boundary edges of the first patch the second edge is one of the second boundary edges of the second patch.

In some examples, the processing circuitry decodes a first array from the second portion. The first array carries UV coordinates for mapping the boundary vertices of the patches into a UV atlas. The processing circuitry determines, according to the first array, first boundary UV coordinates of the first list of boundary vertices for mapping the first patch to a first UV patch in the UV atlas. The first UV patch corresponds to the first patch. The processing circuitry determines according to the first array, second boundary UV coordinates of the second list of boundary vertices for mapping the second patch to a second UV patch in the UV atlas. The second UV patch corresponding to the second patch.

To generate the reconstructed mesh, in some examples, the processing circuitry determines first UV coordinates of first vertices inside the first UV patch and determines second UV coordinates of second vertices inside the second UV patch. In an example, the first vertices and the second vertices are at regular grids of the UV atlas. Further, in some examples, the processing circuitry determines first connectivity information for the first UV patch based on the first UV coordinates of the first vertices and the first boundary UV coordinates of the first list of boundary vertices, and determines second connectivity information for the second UV patch based on the second UV coordinates of the second vertices and the second boundary UV coordinates of the second list of boundary vertices. In an example, the processing circuitry determines a use of a specific connectivity determination technique based on a signal in the bitstream.

In some examples, the processing circuitry decodes a second array from the second portion, the second array carries mesh vertex indices of the mesh corresponding to the boundary vertices of the patches. The processing circuitry determines, according to the second array, first mesh vertex indices for first vertices of the first edge; and determines, according to the second array, second mesh vertex indices for second vertices of the second edge. The first mesh vertex indices for first vertices of the first edge match the second mesh vertex indices for second vertices of the second edge.

In some examples, the processing circuitry decodes a third array from the second portion, the third array carrying 3 dimensional coordinates corresponding to the mesh vertex indices for the boundary vertices of the patches in the mesh.

In an example, the processing circuitry determines, according to the third array, first 3D coordinates for first vertices of the first edge, and determines, according to the third array, second 3D coordinates of second vertices of the second edge. The first 3D coordinates for the first vertices of the first edge matches the second 3D coordinates of the second vertices of the second edge.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which:

FIG. 12 shows a flow chart outlining a process example in some examples.

DETAILED DESCRIPTION OF EMBODIMENTS

Figure 1:
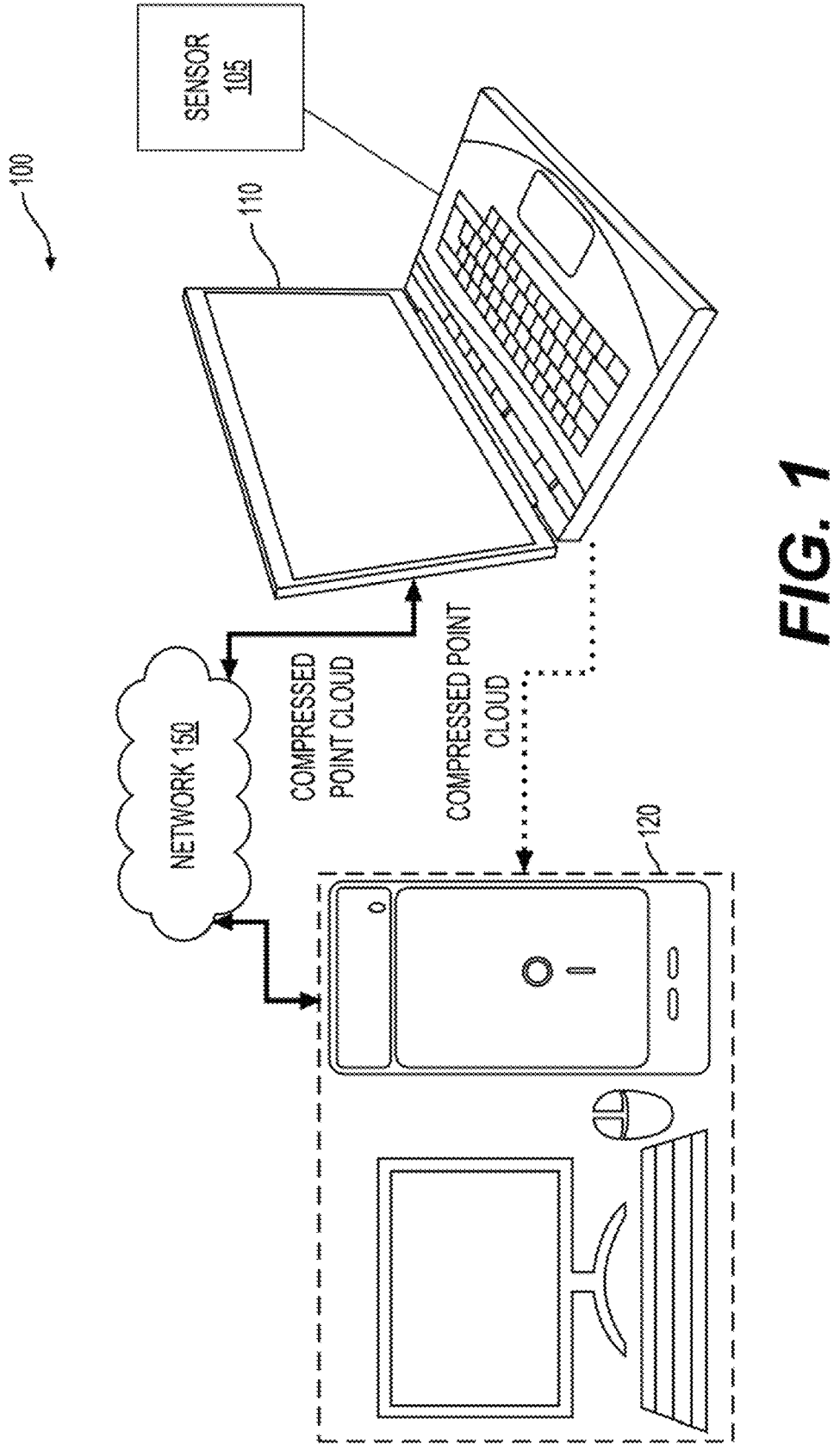
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of such points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include tele-communications networks, local area networks, wide area networks, the Internet, and the like.

Figure 2:
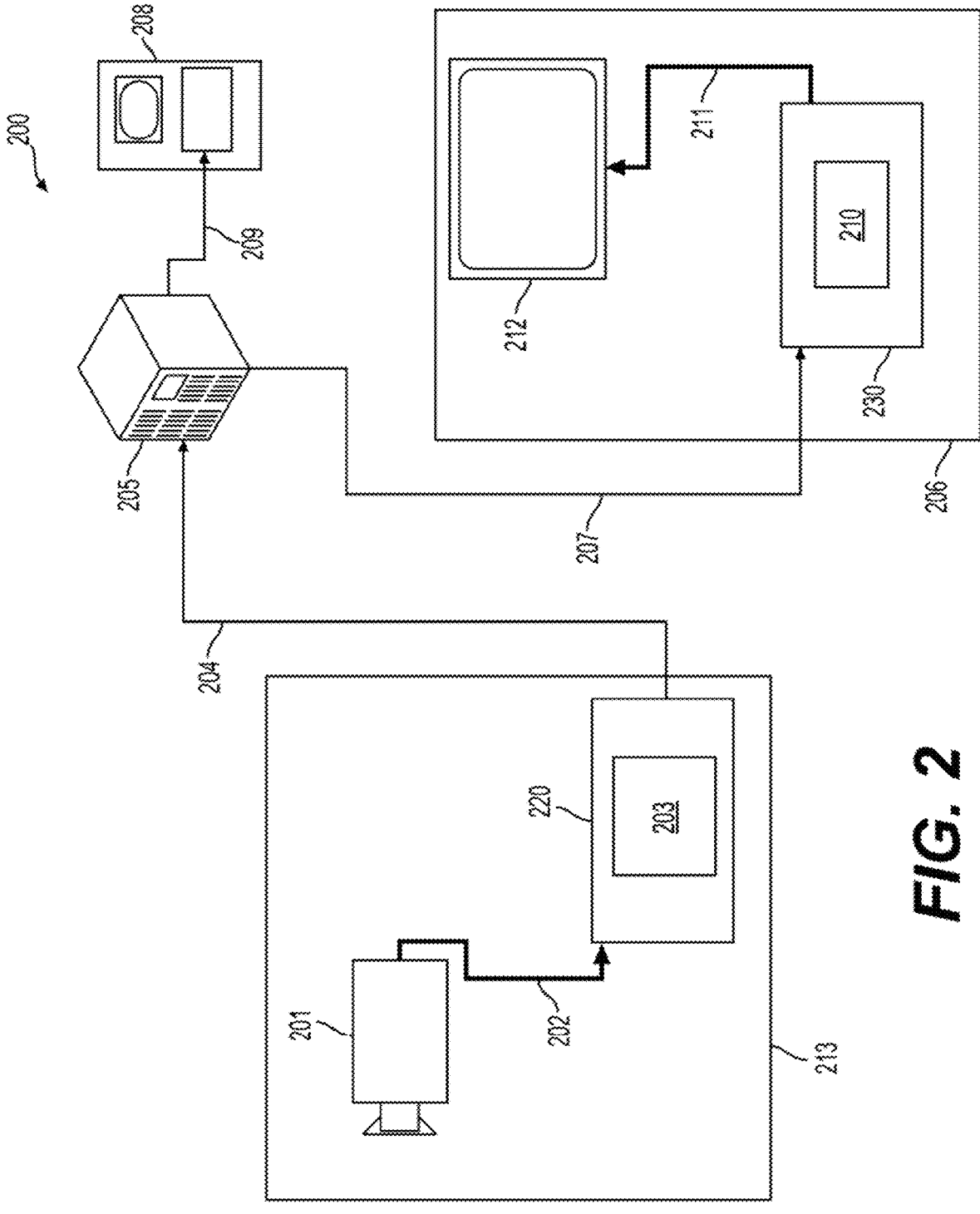
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bit-stream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bit-stream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
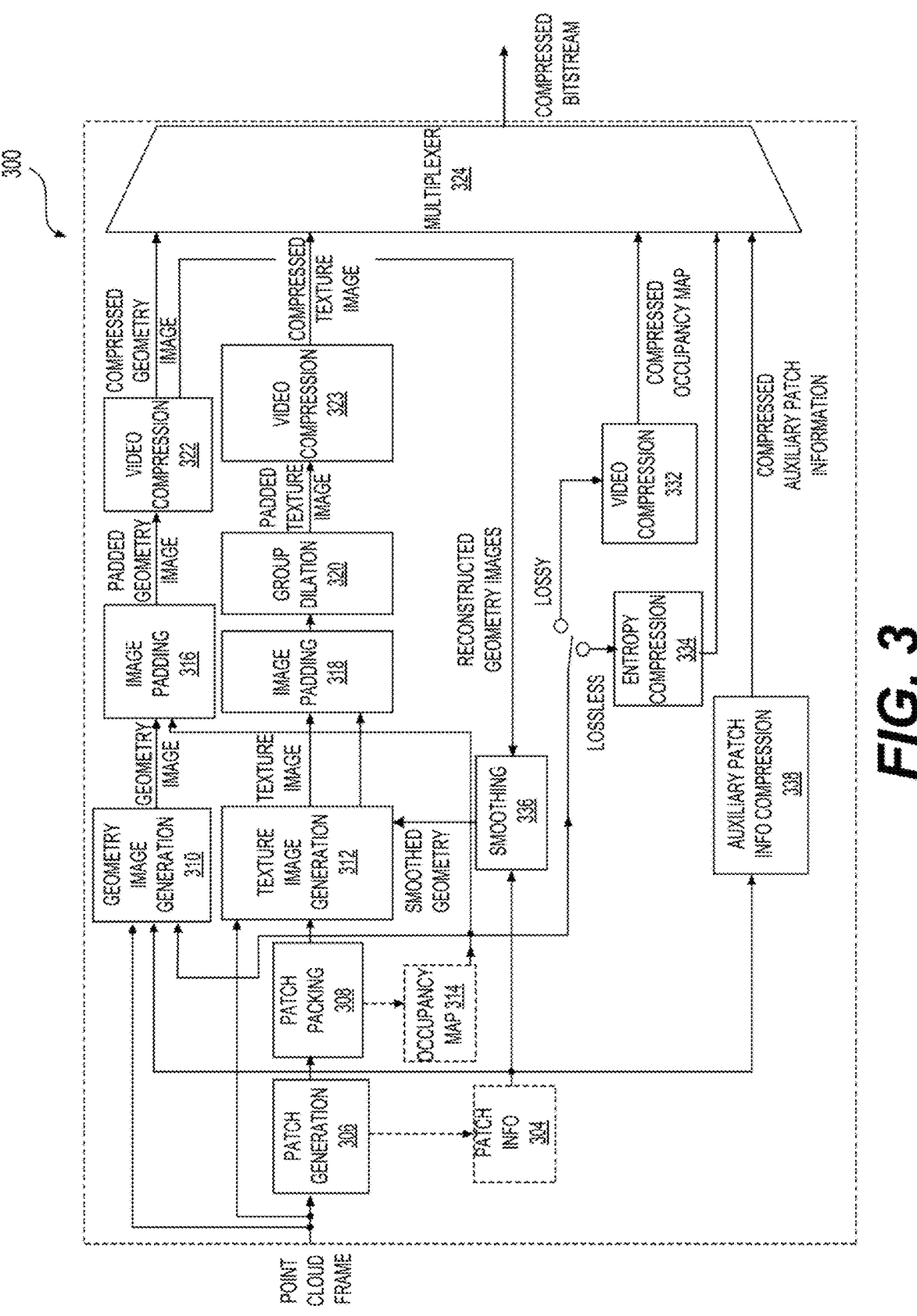
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/ smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
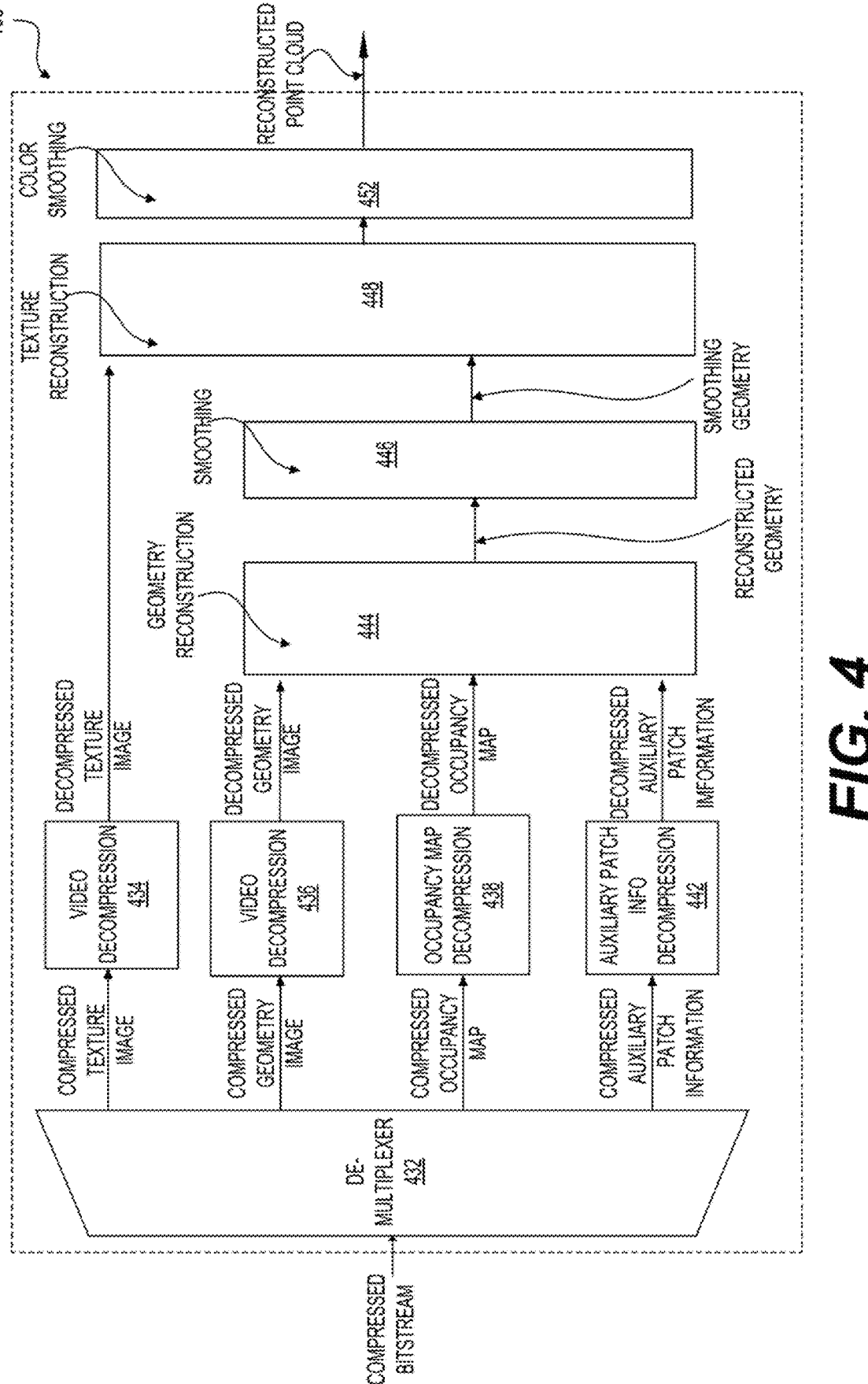
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
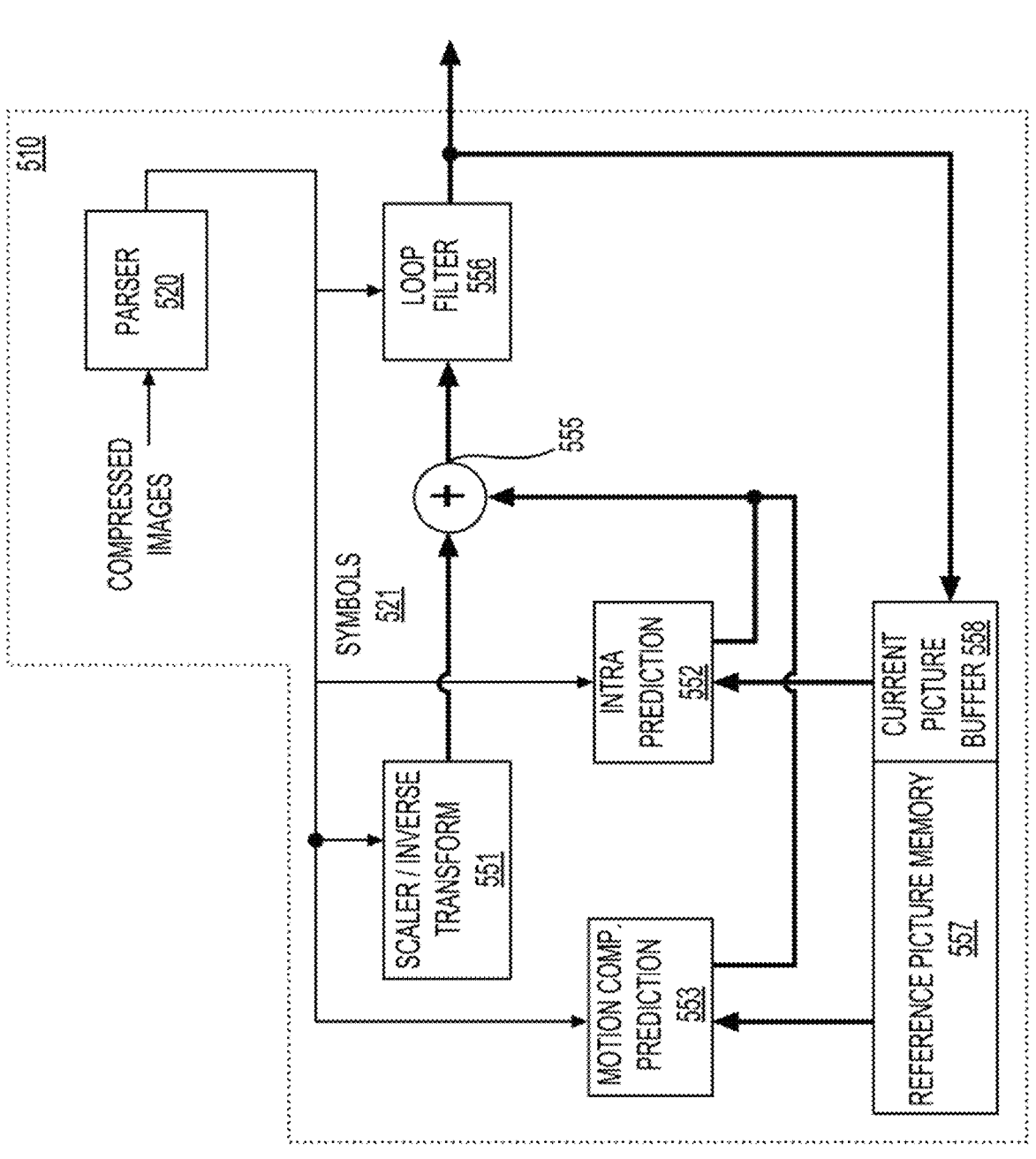
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
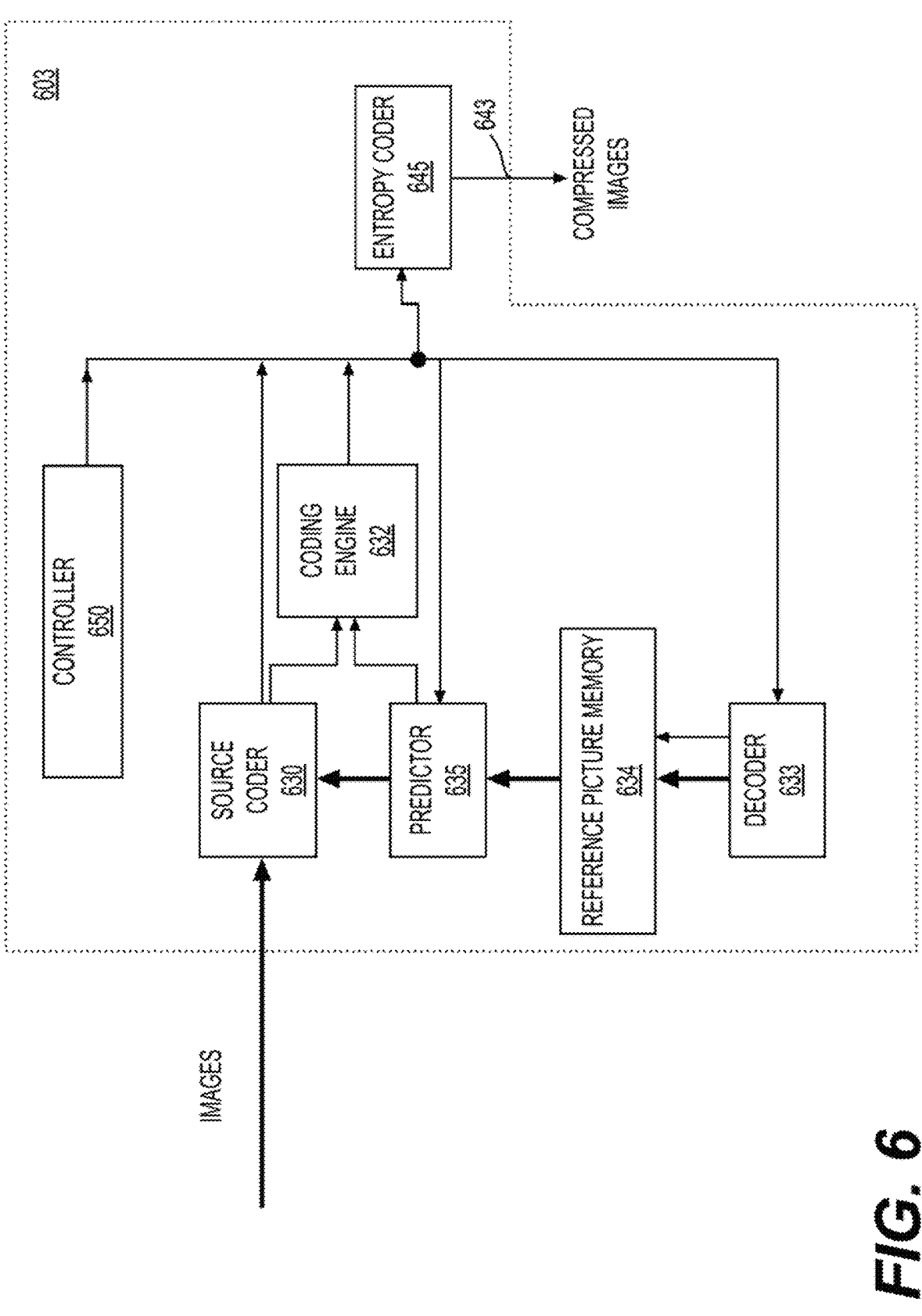
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
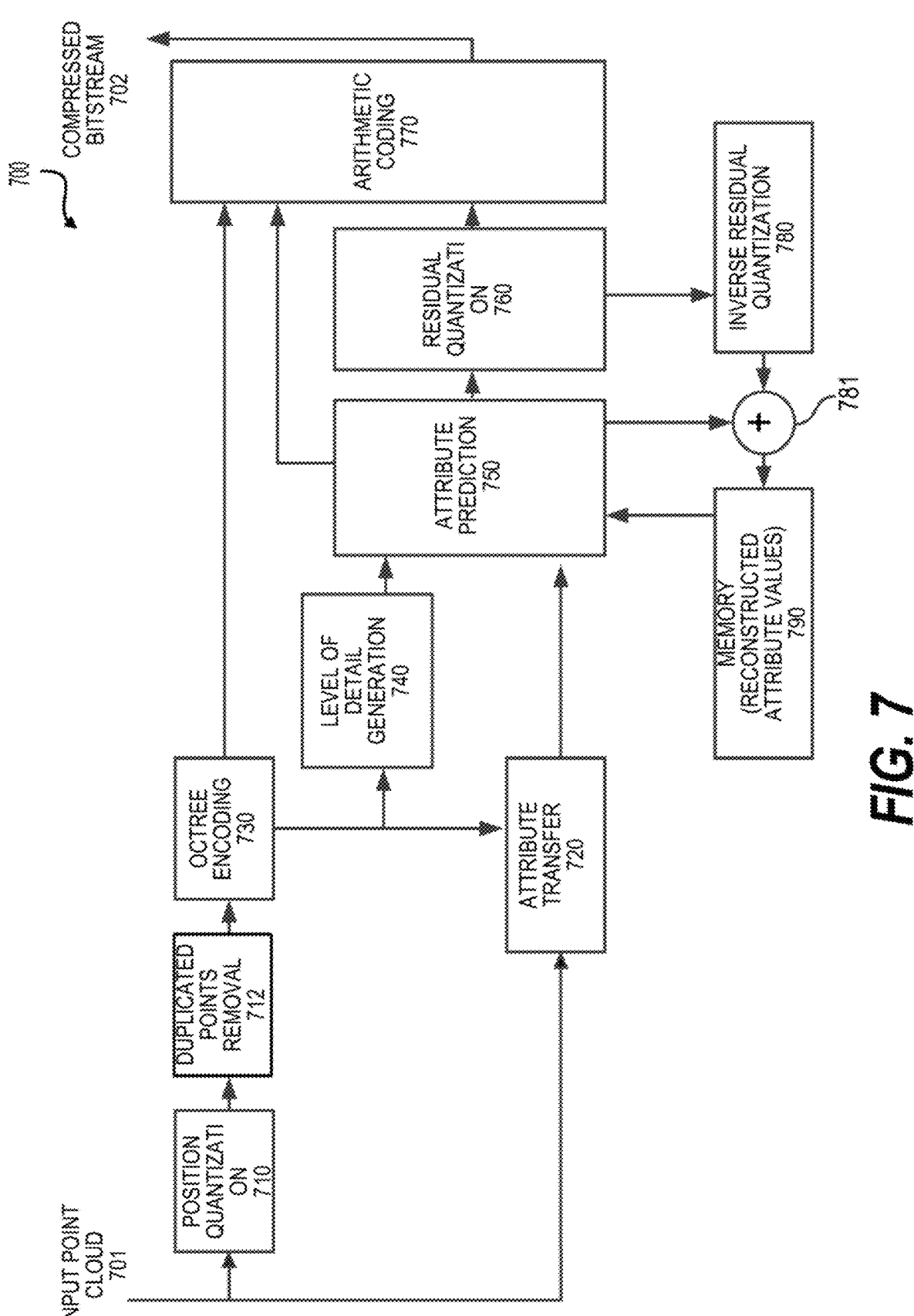
FIG. 7 shows a block diagram of an encoder for encoding point cloud frames, in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
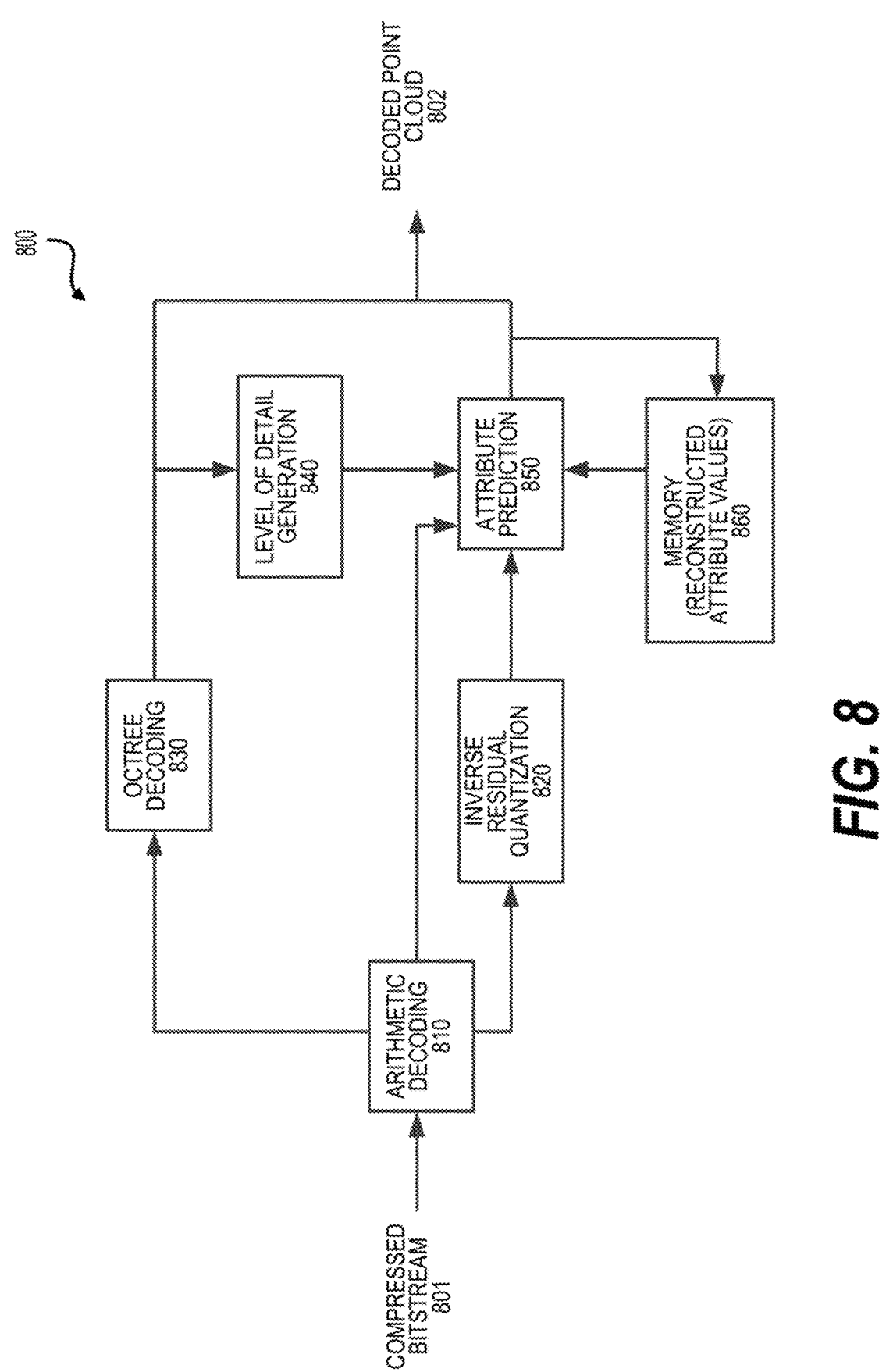
FIG. 8 shows a block diagram of a decoder for decoding a compressed bitstream corresponding to point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches (also referred to as segments in some examples) in the 3D domain. Then, the patches are parameterized respectively into 2D shapes. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) has a color that is equal to the color of the vertex at (x, y, z) in the 3D domain.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

According to some aspects of the disclosure, some mesh compression techniques have lossy compression nature, and the quality of reconstructed meshes can suffer from gaps. In some examples, re-meshing techniques, such as UV atlas sampling technique, are used in mesh compression. The UV atlas sampling technique re-meshes 3D mesh models via regular grid points sampled on the UV atlas. The original vertices in the UV atlas are replaced by regular grid points. The connectivity information can be inferred from the regular grid points and doesn't need to be separately encoded. The sampling points in the UV atlas sampling technique do not coincide with the mesh's vertices on the boundaries of UV patches, hence the reconstructed mesh may have gaps.

According to an aspect of the disclosure, the UV map (also referred to as UV atlas) is generated by partitioning the mesh into patches along cutting paths that consists of certain edges and vertices of the mesh, and parameterizing the patches into UV patches in the UV map. The edges and vertices in the cutting paths are mapped to the boundary edges and boundary vertices of the UV patches in the UV map. For example, an edge in a cutting path is split into 2 boundary edges of two different UV patches in the UV map, and a vertex in a cutting path is split into n (n≥2) boundary vertices of different UV patches in the UV map. The boundary edges resulting from the splitting of a same edge are referred to as edge mates. The boundary vertices resulting from the splitting of a same vertex are referred to as vertex mates. Thus, the boundaries of UV patches are made of edge mates and vertex mates.

In some examples, when the UV atlas sampling technique is used on the UV map to estimate the parameterization, the sampling points do not coincide on the boundary vertices and boundary edges of the UV patches in the UV map. Then, at the decoder side, the boundaries of the reconstructed patches may not satisfy the matching requirements for edge mates and vertex mates, thus gaps may exist between patches.

Figure 9:
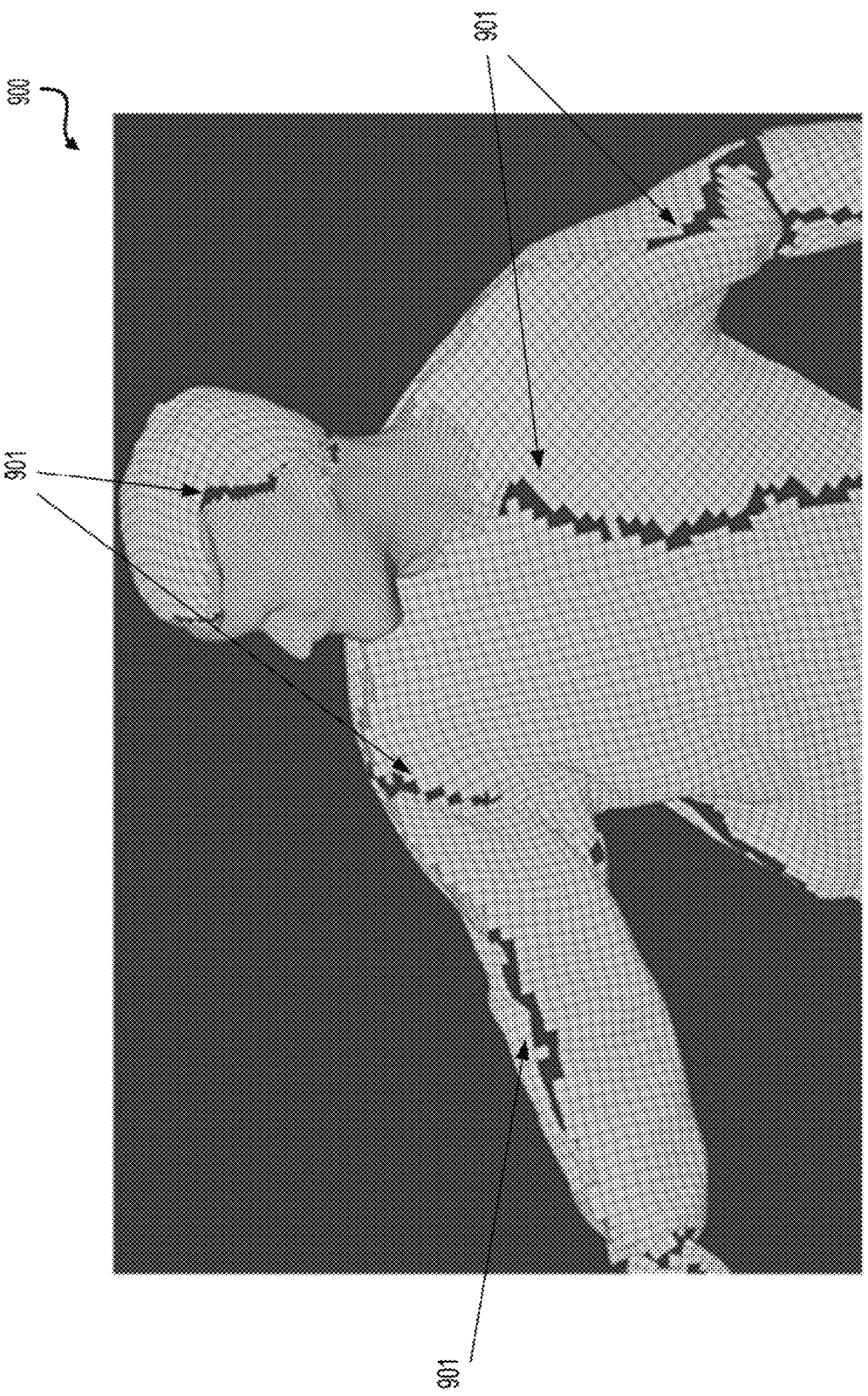
FIG. 9 shows an illustration of a reconstructed mesh in some examples.

FIG. 9 shows an illustration of a reconstructed mesh (900) that is processed based on UV atlas sampling. The reconstructed mesh (900) includes gaps (901) between patches.

Some aspects of the disclosure provide patch zipping techniques (also referred to as patch connecting techniques) for mesh compression. The patch zipping techniques can keep boundary information of UV patches, such as the boundary edges and boundary vertices of UV patches (e.g., original UV patches before remeshing). With the boundary information of the UV patches, a watertight mesh can be reconstructed by the UV atlas sampling techniques in an example.

It is noted that while UV atlas sampling technique is used as an example of lossy compression technique with which the patch zipping technique can be used to achieve filled gaps between patches, other remeshing or compression techniques, regardless of the parameterization, sampling or projection approach, can be utilized with the patch zipping techniques to achieve gap filling effects.

Figure 10:
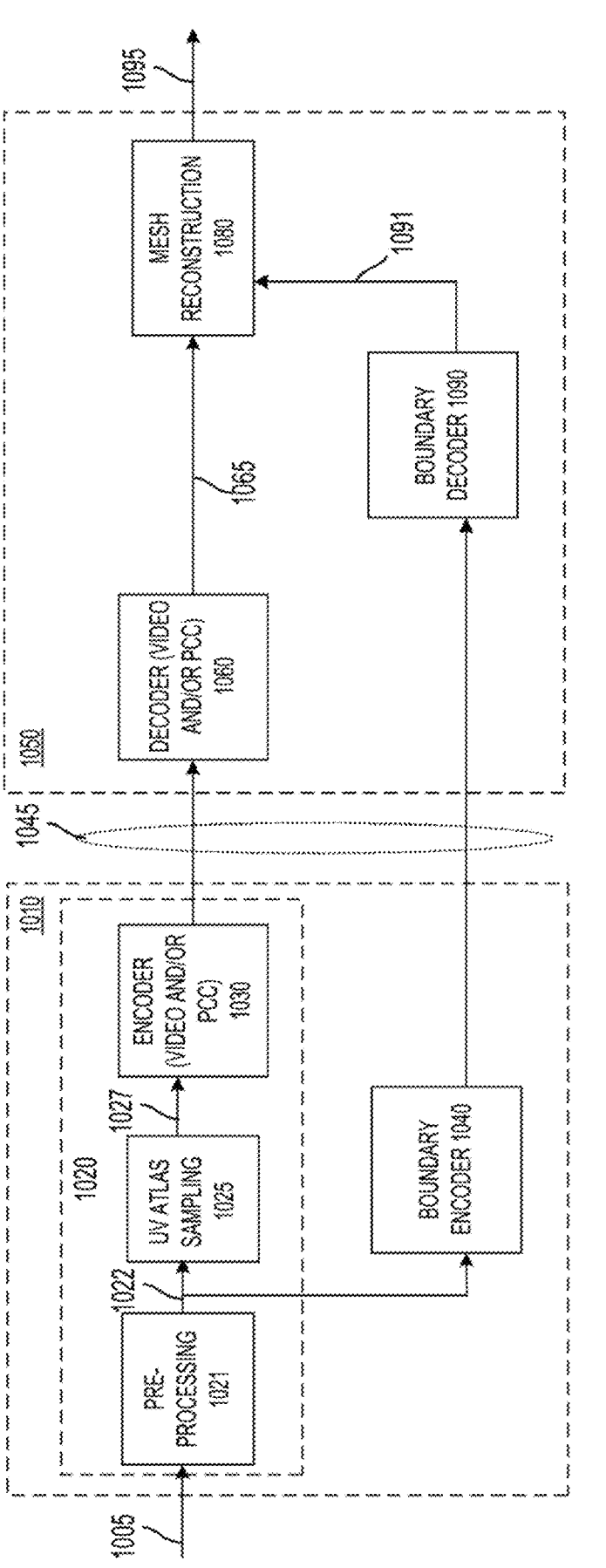
FIG. 10 shows a block diagram of a mesh coding (compression and decompression) framework in some examples.

FIG. 10 shows a diagram of a framework (1000) for mesh compression according to some embodiments of the disclosure. The framework (1000) includes a mesh encoder (1010) and a mesh decoder (1050). The mesh encoder (1010) encodes an input mesh (1005) (a mesh frame in case of a dynamic mesh) into a bitstream (1045), and the mesh decoder (1050) decodes the bitstream (1045) to generate a reconstructed mesh (1095) (a mesh frame in case of a dynamic mesh).

The mesh encoder (1010) can be any suitable device, such as a computer, a server computer, a desktop computer, a laptop computer, a tablet computer, a smart phone, a gaming device, an AR device, a VR device, and the like. The mesh decoder (1050) can be any suitable device, such as a computer, a client computer, a desktop computer, a laptop computer, a tablet computer, a smart phone, a gaming device, an AR device, a VR device, and the like. The bitstream (1045) can be transmitted from the mesh encoder (1010) to the mesh decoder (1050) via any suitable communication network (not shown).

In the FIG. 10 example, the mesh encoder (1010) includes a lossy mesh encoder (1020) and a boundary encoder (1040) coupled together. The lossy mesh encoder (1020) uses techniques that may cause information loss, and the information loss can result gaps a reconstructed mesh. The boundary encoder (1040) is configured to keep boundary information of patches in the input mesh (1005), and encode the boundary information into the bitstream (1045).

In some examples, the lossy mesh encoder (1020) uses a UV atlas sampling technique that may cause information loss and result in gaps in a reconstructed mesh. In the FIG. 10 example, the lossy mesh encoder (1020) includes a pre-processing module (1021), a UV atlas sampling module (1025) and an encoder (1030) coupled together as shown in FIG. 10.

The pre-processing module (1021) partitions the input mesh (1005) to generate patches, and performs parameterization of the patches to generates maps (1022) in 2D domain, such as a UV map and one or more texture maps.

The UV map includes UV patches corresponding to the patches of the input mesh (1005).

The UV atlas sampling module (1025) performs re-meshing by sampling the UV map on the regular grid points to generate a new mesh (1027). In an example, the new mesh (1027) is in the form of a new UV map and new texture maps with vertices mapped to the regular grid points. In some examples, the new mesh (1027) is a reconstructed mesh that is reconstructed from the new UV map and the new texture maps. It is noted that the connectivity information of the new mesh (1027) can be inferred according to the regular grid points.

The encoder (1030) can encode the new mesh (1027). In an example, the encoder (1030) includes a PCC encoder, such as a G-PCC encoder, a V-PCC encoder and the like. The vertices of the new mesh (1027) can form a point cloud, and the encoder (1030) can encode the point cloud using the PCC encoder. In another example, the encoder (1030) includes video encoders that can encode the new UV map and the new texture maps according to suitable video coding standard. The encoder (1030) can be lossy encoder or lossless encoder.

In the FIG. 10 example, the boundary encoder (1040) can extract the patch boundary information from the maps (1022), and encode the patch boundary information into the bitstream (1045). The operations of the boundary encoder (1040) will be further described in the present disclosure.

In the FIG. 10 example, the bitstream (1045) is provided to the mesh decoder (1050). The mesh decoder (1050) includes a decoder (1060), a mesh reconstruction module (1080) and a boundary decoder (1090). In an example, the decoder (1060) corresponds the encoder (1030), and can decode a portion of the bitstream (1045) that is encoded by the encoder (1030) and generate decoded information (1065).

In an example, the encoder (1030) is a PCC encoder, then the decoder (1060) is a PCC decoder. The decoder (1060) can decode the portion of the bitstream (1045) that is encoded by the encoder (1030) to generate a point cloud with points that are vertices of a mesh. For example, the decoded information (1065) includes a point cloud with points that are vertices of a mesh.

In another example, the encoder (1030) includes one or more video encoders, and the decoder (1060) includes one or more video decoders. The decoder (1060) can decode the portion of the bitstream (1045) that is encoded by the encoder (1030) to generate maps, such as a UV map, one or more texture maps and the like. For example, the decoded information (1065) includes a UV map and one or more texture maps that are decoded from the bitstream (1045).

In the FIG. 10 example, the boundary decoder (1090) corresponds the boundary encoder (1040), and can decode a portion of the bitstream (1045) that is encoded by the boundary encoder (1040) and generate decoded patch boundary information (1091).

In the FIG. 10 example, the decoded information (1065) and the decoded patch boundary information (1091) are provided to the mesh reconstruction module (1080). The mesh reconstruction module (1080) generates the reconstructed mesh (1095) based on the decoded information (1065) and the decoded patch boundary information (1091). The operations of the boundary decoder (1090) and the mesh reconstruction (1080) will be further described in the present disclosure.

It is noted that components in the mesh encoder (1010), such as the pre-processing module (1021), the UV atlas sampling module (1025), the encoder (1030), and the boundary encoder (1040) can be respectively implemented by various techniques. In an example, a component is implemented by integrated circuitry. In another example, a component is implemented using software that can be executed by one or more processors.

It is noted that components in the mesh decoder (1050), such as the decoder (1060) and the mesh reconstruction module (1080), and the boundary decoder (1090) can be respectively implemented by various techniques. In an example, a component is implemented by integrated circuitry. In another example, a component is implemented using software that can be executed by one or more processors.

According to an aspect of the disclosure, the boundary encoder (1040) can determine UV patches from the UV map, determine boundaries of the UV patches, store the boundaries of the UV patches as patch boundary data in suitable data structure and encode patch boundary data into the bitstream (1045).

To determine the UV patches from the UV map, in some examples, the boundary encoder (1040) uses triangle traversals algorithms, such as Edgebreaker or valence-based algorithms, to detect sets of connected triangles in the UV map. A set of connected triangles corresponds to a UV patch. It is noted that the boundary encoder (1040) can also receive information (e.g., partition information, parameterization information and the like) from the pre-processing module (1021) and determines the UV patches from the information received from the pre-processing module (1021).

To determine boundaries of a UV patch, in some examples, the boundary encoder (1040) determines boundary vertices and boundary edges. Any suitable techniques can be used to detect the boundary vertices and the boundary edges. In an example, when an edge in a UV patch is not shared by two adjacent triangles of the UV patch, for example the edge belongs to only one triangle of the UV patch, the edge is a boundary edge of the UV patch, and the vertices of the boundary edge are boundary vertices.

In another example, boundary vertices of the UV patches are split from mesh vertices. Thus, vertex mates can be detected from the UV patches based on (x, y, z) of the vertices. For example, when a plurality of vertices of different UV patches have the same (x, y, z) value, the plurality of vertices are vertex mates, and are also boundary vertices of the UV patches. Further, an edge between two boundary vertices is a boundary edge.

In another example, partition information is received from the pre-processing module (1021). For example, the partition information includes information of the cutting paths that partition the input mesh (1005) into patches. The partition information is indicative of the boundary edges and boundary vertices.

The patch boundary information can be stored in suitable data structures. In an example, boundary vertices of a UV patch are stored in a specific order, such as clockwise order, a counter-clockwise order, and the like. In some examples, a hash table (e.g., referred to as boundary_table) is constructed to store the boundary vertices for the UV patches, the hash table (e.g., boundary_table) includes a plurality of table entries respectively corresponding to the UV patches, and each table entry is a list of boundary vertices of the corresponding UV patches. For example, an entry corresponding to a UV patch can be accessed according to a label of the UV patch, and the entry stores a list of boundary vertex indices of the UV patch in a fixed order, such as counter-clockwise order. In an example, a hash function is applied to a label for the $i^{th}$ UV patch to obtain value i to access the table entry boundary_table[i]. The table entry boundary_table[i] stores a list of boundary vertex indices, such as boundary_table[i]=[idx_1, idx_2, idx_3, . . . , idx_m], m denotes the number of boundary vertices of the $i^{th}$ UV patch, the indices of boundary vertices of the i-th UV patch are idx_1, idx_2, idx_3, . . . , idx_m. Thus, the boundary edges are (idx_1, idx_2), (idx_2, idx_3), . . . , (idx_m, idx_1).

It is noted that, in an example, the indices in the boundary table are boundary vertices indices defined for the boundary vertices in the UV atlas only, excluding the vertices inside UV patches.

Further, detail information of the boundary vertices of the UV patches is stored. For example, for each boundary vertex of the UV patches, UV coordinates of the boundary vertex in the UV atlas, the corresponding mesh vertex index for example in the input mesh (1005) and the 3D coordinates for example in the input mesh (1005) are stored. In some examples, for each boundary vertex, 6 integers (e.g., u coordinate in the UV atlas, v coordinate in the UV atlas, mesh vertex index in the input mesh (1005), x coordinate in the input mesh (1005), y coordinate in the input mesh (1005), z coordinate in the input mesh (1005)) are stored in association with the boundary vertex. In an example, 3 arrays that are referred as boundary_uv, boundary_idx, boundary_xyz are used to store the detail information of the boundary vertices. Each of the three arrays include array entries respectively for the boundary vertices. An array entry for a boundary vertex can be accessed by a boundary vertex index. An array entry in the array boundary_uv for a boundary vertex stores UV coordinates of the boundary vertex in the UV atlas. An array entry in the array boundary_idx for a boundary vertex stores the mesh vertex index (e.g., of the input mesh (1005)) of the boundary vertex in the UV atlas. An array entry in the array boundary_xyz for a boundary vertex stores 3D coordinates of a corresponding mesh vertex in the input mesh (1005).

Accordingly, in an example, vertex mates can have same value for mesh vertex index and same value for 3D coordinates.

In another example, for mesh sequences, the detail information of the boundary vertices is stored using two 3-channel images. For example, the UV coordinates and the corresponding mesh vertex indices of the boundary vertices are stored for example as 3 channels in a first 3-channel image, and the 3D coordinates of the boundary vertices are stored for example as 3 channels in a second 3-channel image.

It is noted that the mesh vertices corresponding to the boundary vertices of UV patches are on the cutting paths, so the corresponding mesh vertex indices described here are defined for those cutting path vertices.

According to an aspect of the disclosure, with the boundary information, occupancy maps may not be necessarily coded in the bitstream (1045). For example, points inside the UV patches and point outside the UV patches can be determined based on the boundary information. More specifically, points inside the polygons defined by the boundary vertices of a UV patch can be inferred as occupied points, and belong to the UV patch. If a point on the UV atlas does not belong to any UV patch, then the point can be inferred as unoccupied. In some examples, the encoder (1030) includes video encoders to encode geometry images and does not include video encoder for the occupancy maps.

In an example, the boundary encoder (1040) encodes the boundary_table and boundary_idx into the bitstream (1045) using lossless coding techniques, and encodes boundary_xyz and boundary_uv into the bitstream (1045) using lossy or lossless coding techniques. In another example, the boundary encoder (1040) encodes the boundary_table, boundary_uv and boundary_idx into the bitstream (1045) using lossless coding techniques, and encodes boundary_xyz into the bitstream (1045) using lossy or lossless coding techniques.

In some examples, boundary information of each mesh frame is coded independently. In some examples, the boundary information of mesh frames can be coded by exploring the inter-frame correlations. For example, inter-frame prediction and inter-frame related context modeling in entropy coding can be applied when coding the boundary information.

According to an aspect of the disclosure, the boundary decoder (1090) is configured to decode the boundary information, such as boundary_table, boundary_uv, boundary_idx, boundary_xyz from the bitstream (1045). In an example, the mesh reconstruction module (1080) can generate the reconstructed mesh (1095) patch by patch. For each UV patch, the mesh reconstruction module (1080) applies the hash function on the label of the UV patch to determine a table entry index of a table entry in the boundary_table. Then, the mesh reconstruction module (1080) accesses the table entry to obtain a list of boundary vertex indices of the boundary vertices for the UV patch, and determines boundary edges of the UV patch based on the boundary vertices.

In some examples, based on the boundary vertex indices of the boundary vertices of the UV patch from boundary_table, the array boundary_uv is accessed to obtain the UV coordinates of the boundary vertices of the UV patch. Further, in some examples, when the UV atlas sampling technique is used, the sampling points on the regular grids inside the UV patch can be determined and UV coordinates of the sampling points can be determined.

In some examples, with the obtained UV coordinates and the boundary edges of the UV patch, connectivity information can be inferred, and faces of the UV patch can be generated. In an example, constrained Delaunay triangulation technique can be used based on the obtained UV coordinates of points inside the UV patch and the boundary edges of the UV patch to produce re-meshed triangle faces of the UV patch. It is noted that other suitable triangulation or remeshing techniques can be used to generate the faces of the UV patch. In some examples, the bitstream includes a signal that indicates a specific triangulation or remeshing technique to use.

According to an aspect of the disclosure, the 3D coordinates of vertices inside the UV patch can be obtained from the geometry image, such as according to the UV map. For boundary vertices on the UV patch boundary, in an example, the indices of the boundary vertices of a UV patch can be determined from boundary_table, then the corresponding mesh vertex indices can be determined according to the array boundary_idx. In an example, the array boundary_xyz stores the 3D coordinates corresponding to the mesh vertex indices, then the 3D coordinates of the boundary vertices can be determined based on the mesh vertex indices for the boundary vertices. In another example, the array boundary_xyz stores the 3D coordinates corresponding to the indices of boundary vertices in the UV patch, then indices of the boundary vertices from the boundary_table can be used to get the 3D coordinates of the boundary vertices from the array boundary_xyz.

Figure 11:
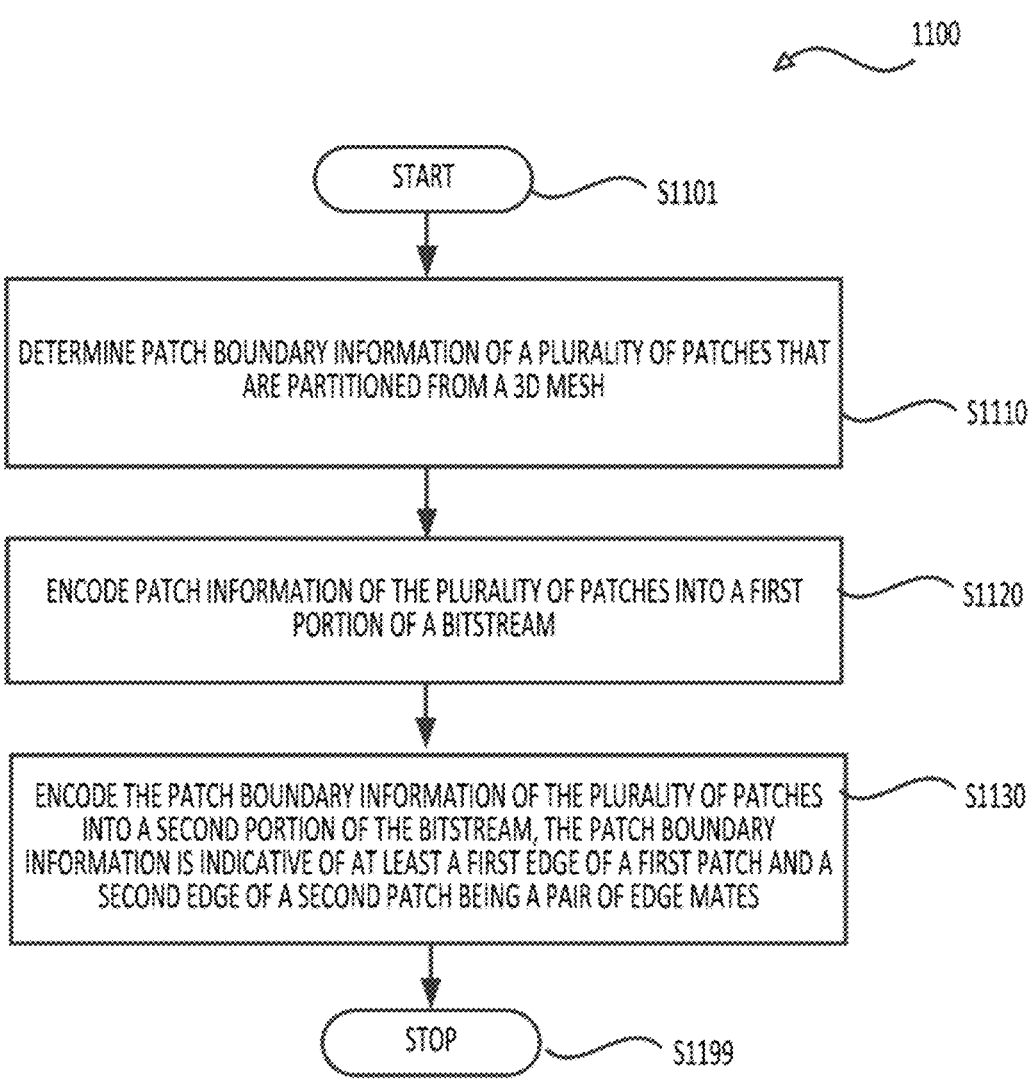
FIG. 11 shows a flow chart outlining a process example in some examples.

FIG. 11 shows a flow chart outlining a process (1100) according to an embodiment of the disclosure. The process (1100) can be used during an encoding process for a mesh.

In various embodiments, the process (1100) is executed by processing circuitry. In some embodiments, the process (1100) is implemented in software instructions, thus when the processing circuitry executes the software instructions, the processing circuitry performs the process (1100). The process starts at (S1101) and proceeds to (S1110).

At (S1110), patch boundary information of a plurality of patches that are partitioned from a mesh is determined.

At (S1120), patch information of the plurality of patches is encoded into a first portion of a bitstream.

At (S1130), the patch boundary information of the plurality of patches is encoded into a second portion of the bitstream. The patch boundary information is indicative of at least a first edge of a first patch and a second edge of a second patch being a pair of edge mates.

According to an aspect of the disclosure, the patch information in the first portion has different patch boundary information from the patch boundary information in the second portion. For example, the patch information is encoded by techniques having lossy compression nature, such as including a UV atlas sampling technique, and the like.

In some embodiments, UV patches in a UV atlas are encoded into the first portion of the bitstream, information of boundaries of the UV patches is encoded into the second portion of the bitstream. The UV patches in the UV atlas correspond to the plurality of patches in the mesh.

In some embodiments, to determine the patch boundary information, the UV patches are determined from the UV atlas, and the boundaries of the UV patches are determined. In some examples, to determine the UV patches, a first set of connected triangles in the UV atlas is detected, the first set of connected triangles forms a first UV patch. To determine the boundaries of the UV patches, in an example, a set of edges of the first UV patch is detected, each of the set of edges is not shared by 2 adjacent triangles of the first UV patch. In another example, a set of vertices of the first UV patch is detected, each of the set of vertices has at least a vertex mate in another UV patch.

In some examples, to encode the UV patches, the UV atlas is sampled on regular grids to generate a new mesh; and information of the new mesh is encoded into the first portion of the bitstream.

In some examples, to encode the information of the boundaries of the UV patches, a boundary table is encoded into the second portion. The boundary table (e.g., boundary_table) includes lists of boundary vertices of the plurality of UV patches. In some examples, a first array is encoded into the second portion, the first array (e.g., boundary_uv) carries UV coordinates for mapping the boundary vertices of the plurality of patches into a UV atlas. Further, a second array (e.g., boundary_idx) is encoded into the second portion in some examples. The second array carries mesh vertex indices of the mesh corresponding to the boundary vertices of the plurality of UV patches. In some examples, a third array (e.g., boundary_xyz) is encoded into the second portion, the third array carries 3 dimensional coordinates corresponding to the mesh vertex indices for the boundary vertices of the plurality of the UV patches. In some other examples, a third array (e.g., boundary_xyz) is encoded into the second portion, the third array carries 3 dimensional coordinates corresponding to the boundary vertices indices for the boundary vertices of the plurality of the UV patches.

According to an aspect of the disclosure, an occupancy map can be determined based on the boundary information encoded in the second portion of the bitstream, thus the first portion does not need to include an occupancy map in an example.

Then, the process proceeds to (S1199) and terminates.

The process (1100) can be suitably adapted. Step(s) in the process (1100) can be modified and/or omitted. Additional step(s) can be added. Any suitable order of implementation can be used.

FIG. 12 shows a flow chart outlining a process (1200) according to an embodiment of the disclosure. The process (1200) can be used during a decoding process for a mesh. In various embodiments, the process (1200) is executed by processing circuitry. In some embodiments, the process (1200) is implemented in software instructions, thus when the processing circuitry executes the software instructions, the processing circuitry performs the process (1200). The process starts at (S1201) and proceeds to (S1210).

At (S1210), a bitstream carrying encoded information of a mesh is received. The mesh is partitioned into patches, and the bitstream includes a first portion and a second portion. The first portion includes patch information, the second portion includes patch boundary information indicative of at least a first edge of a first patch and a second edge of a second patch being a pair of edge mates.

At (S1220), the first portion is decoded to obtain the patch information.

At (S1230), the second portion is decoded to obtain the patch boundary information.

At (S1240), a reconstructed mesh is generated based on the patch information and the patch boundary information. The first edge and the second edge are mapped into a same edge in the reconstructed mesh to zip (connect) the first patch and the second patch together.

In some examples, the patch information decoded from the first portion has different patch boundary information from the patch boundary information decoded from the second portion. For example, the patch information is encoded by techniques having lossy compression nature, such as including a UV atlas sampling technique, and the like.

In some embodiments, to decode the second portion, a boundary table (e.g., boundary_table) is decoded from the second portion. The boundary table includes lists of boundary vertices of the UV patches in the UV atlas. In some examples, a first list of boundary vertices for the first patch is determined according to the boundary table and a second list of boundary vertices for the second patch is determined according to the boundary table. Further, first boundary edges for the first patch are determined according to the first list of boundary vertices, the first edge is one of the first boundary edges of the first patch. Second boundary edges of the second patch are determined according to the second list of boundary vertices, the second edge is one of the second boundary edges of the second patch.

To decode the second portion, in some examples, a first array (e.g., boundary_uv) is decoded from the second portion. The first array carries UV coordinates for mapping the boundary vertices of the patches into a UV atlas. According to the first array, first boundary UV coordinates of the first list of boundary vertices are determined for mapping the first patch to a first UV patch in the UV atlas, the first UV patch corresponds to the first patch. According to the first array, second boundary UV coordinates of the second list of boundary vertices are determined for mapping the second patch to a second UV patch in the UV atlas, the second UV patch corresponds to the second patch.

In some examples, to generate the reconstructed mesh, first UV coordinates of first vertices inside the first UV patch are determined, and second UV coordinates of second vertices inside the second UV patch are determined. For example, the first vertices and the second vertices are at regular grids of the UV atlas. In some examples, first connectivity information for the first UV patch is determined based on the first UV coordinates of the first vertices inside the first UV patch and the first boundary UV coordinates of the first list of boundary vertices, and second connectivity information for the second UV patch based on the second UV coordinates of the second vertices inside the second UV patch and the second boundary UV coordinates of the second list of boundary vertices. The first connectivity information and the second connectivity information can be determined by any suitable techniques. In an example, a use of a specific connectivity determination technique is determined based on a signal in the bitstream.

In some examples, a second array (e.g., boundary_idx) is decoded from the second portion, the second array carries mesh vertex indices of the mesh corresponding to the boundary vertices of the patches. In an example, according to the second array, first mesh vertex indices for first vertices of the first edge is determined, and second mesh vertex indices for second vertices of the second edge is determined. The first mesh vertex indices for first vertices of the first edge match the second mesh vertex indices for second vertices of the second edge. Thus, the first edge and the second edge are edge mates. Further, in an example, a third array (e.g., boundary_xyz) is decoded from the second portion. The third array carries 3 dimensional coordinates corresponding to the mesh vertex indices.

In some other examples, a third array (e.g., boundary_xyz) is decoded from the second portion. The third array carries 3 dimensional (3D) coordinates corresponding to the boundary vertex indices of the UV patches. In an example, according to the third array, first 3D coordinates for first vertices of the first edge are determined, and second 3D coordinates of second vertices of the second edge are determined. The first 3D coordinates for the first vertices of the first edge match the second 3D coordinates of the second vertices of the second edge, thus the first edge and the second edge are edge mates.

Then, the process proceeds to (S1299) and terminates.

The process (1200) can be suitably adapted. Step(s) in the process (1200) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
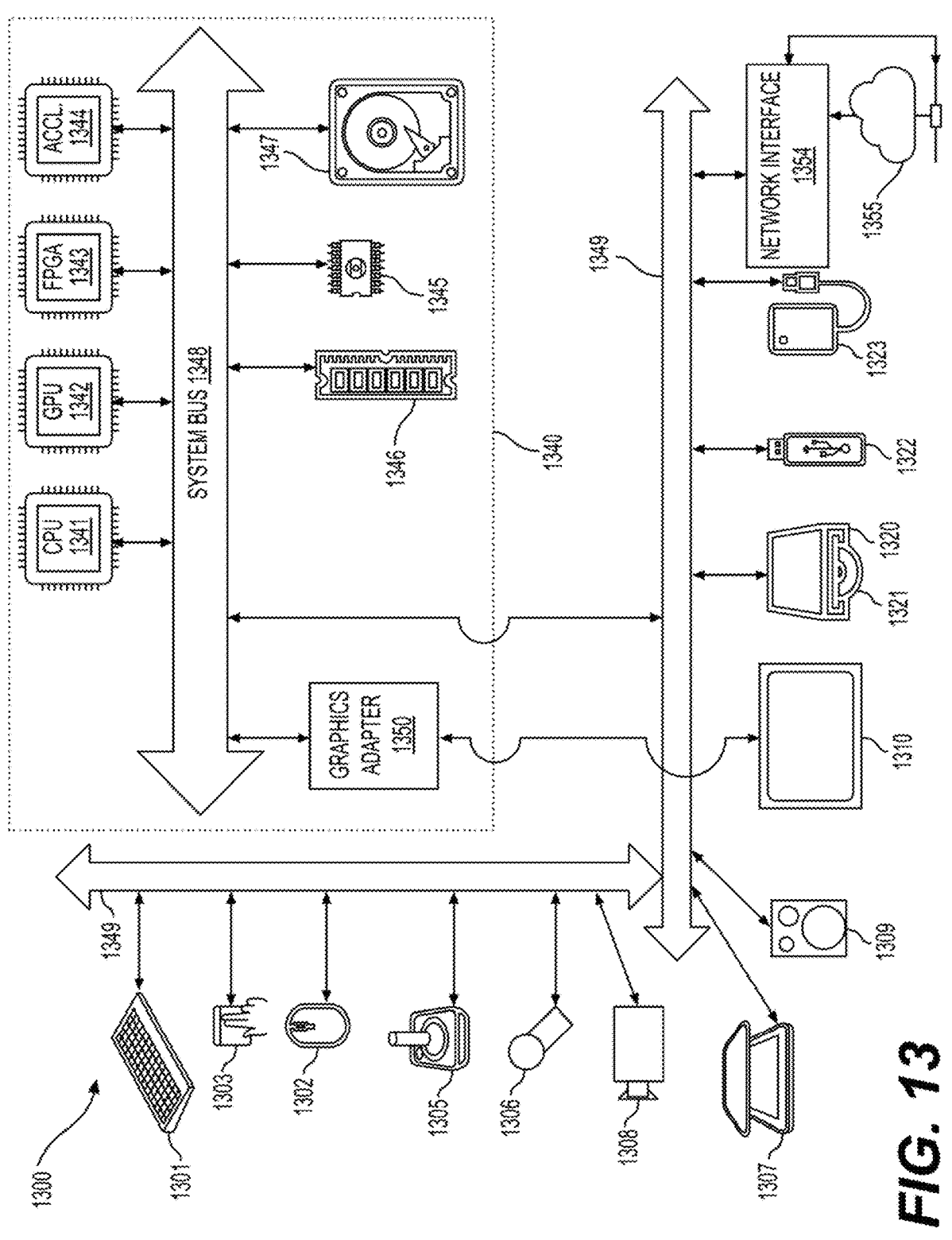
FIG. 13 is a schematic illustration of a computer system in some examples.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical.

Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh decompression, comprising:
receiving a bitstream carrying encoded information of a mesh that is partitioned into patches, the bitstream comprising a first portion and a second portion, the first portion comprising patch information, the second portion comprising patch boundary information indicative of at least a first edge of a first patch and a second edge of a second patch being a pair of edge mates;
decoding the first portion to obtain the patch information;
decoding the second portion to obtain the patch boundary information, the patch boundary information including a boundary table that indicates, for each of the patches, (i) a first mapping between mesh vertex indices and boundary vertices of the respective patch; (ii) a second mapping between the mesh vertex indices and UV coordinates of the boundary vertices of the respective patch, and (iii) a third mapping between the mesh vertex indices and three-dimensional (3D) coordinates of the boundary vertices of the respective patch; and
generating a reconstructed mesh based on the patch information and the patch boundary information, the first edge and the second edge being mapped into a same edge in the reconstructed mesh to connect the first patch with the second patch.

2. The method of claim 1, wherein the patch information decoded from the first portion has different patch boundary information from the patch boundary information decoded from the second portion.

3. The method of claim 1, wherein the decoding the second portion further comprises:

decoding the boundary table from the second portion, the boundary table including lists of boundary vertices associated with the patches;

determining a first list of boundary vertices associated with the first patch and a second list of boundary vertices associated with the second patch according to the boundary table;

determining first boundary edges for the first patch according to the first list of boundary vertices, the first edge being a boundary edge of the first patch; and determining second boundary edges of the second patch according to the second list of boundary vertices, the second edge being a boundary edge of the second patch.

4. The method of claim 3, wherein the decoding the second portion further comprises:

decoding a first array from the second portion, the first array carrying the UV coordinates of the boundary vertices for mapping the boundary vertices of the patches into a UV atlas;

determining, according to the first array, first boundary UV coordinates of the first list of boundary vertices for mapping the first patch to a first UV patch in the UV atlas, the first UV patch corresponding to the first patch; and determining, according to the first array, second boundary UV coordinates of the second list of boundary vertices for mapping the first patch to a second UV patch in the UV atlas, the second UV patch corresponding to the second patch.

5. The method of claim 4, wherein the generating the reconstructed mesh further comprises:

determining first UV coordinates of first vertices inside the first UV patch; and determining second UV coordinates of second vertices inside the second UV patch.

6. The method of claim 5, wherein the first vertices and the second vertices are at regular grids of the UV atlas.

7. The method of claim 5, further comprising:

determining first connectivity information for the first UV patch based on the first UV coordinates of the first vertices and the first boundary UV coordinates of the first list of boundary vertices; and determining second connectivity information for the second UV patch based on the second UV coordinates of the second vertices and the second boundary UV coordinates of the second list of boundary vertices.

8. The method of claim 7, further comprising:

determining a use of a specific connectivity determination technique based on a signal in the bitstream.

9. The method of claim 5, further comprising:

decoding a second array from the second portion, the second array carrying the mesh vertex indices of the mesh corresponding to the boundary vertices of the patches;

determining, according to the second array, first mesh vertex indices for first vertices of the first edge; and determining, according to the second array, second mesh vertex indices for second vertices of the second edge, the first mesh vertex indices for first vertices of the first edge matching the second mesh vertex indices for second vertices of the second edge.

10. The method of claim 9, further comprising:

decoding a third array from the second portion, the third array carrying the 3D coordinates corresponding to the mesh vertex indices for the boundary vertices of the patches.

11. The method of claim 5, further comprising:

decoding a third array from the second portion, the third array carrying (3D) the 3D coordinates of the boundary vertices of the patches in the mesh;

determining, according to the third array, first 3D coordinates for first vertices of the first edge; and determining, according to the third array, second 3D coordinates of second vertices of the second edge, the first 3D coordinates for the first vertices of the first edge matching the second 3D coordinates of the second vertices of the second edge.

12. A method for mesh encoding, the method comprising:

partitioning a mesh into patches;

encoding patch information of the patches into a first portion of a bitstream; and encoding patch boundary information of the patches into a second portion of the bitstream, the patch boundary information including a boundary table that indicates, for each of the patches, (i) a first mapping between mesh vertex indices and boundary vertices of the respective patch; (ii) a second mapping between the mesh vertex indices and UV coordinates of the boundary vertices of the respective patch, and (iii) a third mapping between the mesh vertex indices and three-dimensional (3D) coordinates of the boundary vertices of the respective patch, the patch boundary information being indicative of at least a first edge of a first patch of the patches and a second edge of a second patch of the patches being a pair of edge mates.

13. The method of claim 12, wherein the patch information included in the first portion of the bitstream has different patch boundary information from the patch boundary information included in the second portion of the bitstream.

14. The method of claim 12, wherein the encoding the patch boundary information of the patches further comprises:

encoding the boundary table into the second portion, wherein:

the boundary table includes lists of boundary vertices associated with the patches, a first list of boundary vertices is associated with the first patch and a second list of boundary vertices is associated with the second patch according to the boundary table;

first boundary edges for the first patch are associated with the first list of boundary vertices, the first edge being a boundary edge of the first patch; and second boundary edges of the second patch are associated with the second list of boundary vertices, the second edge being a boundary edge of the second patch.

15. The method of claim 14, wherein the encoding the patch boundary information of the patches further comprises:

encoding a first array into the second portion, the first array carrying the UV coordinates of the boundary vertices for mapping the boundary vertices of the patches into a UV atlas;

encoding, according to the first array, first boundary UV coordinates of the first list of boundary vertices for mapping the first patch to a first UV patch in the UV atlas, the first UV patch corresponding to the first patch; and encoding, according to the first array, second boundary UV coordinates of the second list of boundary vertices for mapping the first patch to a second UV patch in the UV atlas, the second UV patch corresponding to the second patch.

16. The method of claim 15, further comprising:

encoding first UV coordinates of first vertices inside the first UV patch; and encoding second UV coordinates of second vertices inside the second UV patch.

17. The method of claim 16, wherein the first vertices and the second vertices are at regular grids of the UV atlas.

18. The method of claim 16, further comprising:

encoding first connectivity information for the first UV patch based on the first UV coordinates of the first vertices and the first boundary UV coordinates of the first list of boundary vertices; and encoding second connectivity information for the second UV patch based on the second UV coordinates of the second vertices and the second boundary UV coordinates of the second list of boundary vertices.

19. A non-transitory computer-readable storage medium storing instructions which when executed by a processor cause the processor to perform an encoding method comprising:

partitioning a mesh into patches;

encoding patch information of the patches into a first portion of a bitstream; and encoding patch boundary information of the patches into a second portion of the bitstream, the patch boundary information including a boundary table that indicates, for each of the patches, (i) a first mapping between mesh vertex indices and boundary vertices of the respective patch; (ii) a second mapping between the mesh vertex indices and UV coordinates of the boundary vertices of the respective patch, and (iii) a third mapping between the mesh vertex indices and three-dimensional (3D) coordinates of the boundary vertices of the respective patch, the patch boundary information being indicative of at least a first edge of a first patch of the patches and a second edge of a second patch of the patches being a pair of edge mates; and transmitting the encoded bitstream.

\*    \*    \*    \*    \*